(12) United States Patent
Fleureau et al.

(10) Patent No.: US 9,640,141 B2
(45) Date of Patent: May 2, 2017

(54) METHOD AND APPARATUS FOR AMBIENT LIGHTING COLOR DETERMINATION

(71) Applicant: Thomson Licensing, Issy de Moulineaux (FR)

(72) Inventors: Julien Fleureau, Rennes (FR); Jeremie Bernon, Rueil Malmaison (FR); Fabien Danieau, Rennes (FR); Philippe Guillotel, Vern sur Sieche (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/432,820

(22) PCT Filed: Sep. 26, 2013

(86) PCT No.: PCT/EP2013/070094
§ 371 (c)(1),
(2) Date: Apr. 1, 2015

(87) PCT Pub. No.: WO2014/053391
PCT Pub. Date: Apr. 10, 2014

(65) Prior Publication Data
US 2015/0248872 A1 Sep. 3, 2015

(30) Foreign Application Priority Data
Oct. 4, 2012 (EP) .................................... 12306210

(51) Int. Cl.
*G09G 5/02* (2006.01)
*G06K 9/46* (2006.01)
*H05B 37/02* (2006.01)

(52) U.S. Cl.
CPC ............. *G09G 5/02* (2013.01); *G06K 9/4671* (2013.01); *H05B 37/029* (2013.01); *G09G 2360/144* (2013.01)

(58) Field of Classification Search
CPC ................. G06T 7/0034; G06T 7/0048; G06T 2207/20164; G06T 2207/20144; H04N 5/2226
See application file for complete search history.

(56) References Cited

U.S. PATENT DOCUMENTS 6,611,297 B1    8/2003    Akashi et al.
7,894,000 B2    2/2011    Gutta et al.
(Continued)

FOREIGN PATENT DOCUMENTS

WO    WO2007026283    3/2007
WO    WO2010061334    6/2010

OTHER PUBLICATIONS

"Saliency-Guided Lighting—UMD Department of Computer Science" Lee et al. IIEICE Trans. Inf. & Syst., vol. E92-D, No. 2 Feb. 2009. Accessed via the web @ https://www.cs.umd.edu/gvil/papers/lee_IEICE09.pdf on Sep. 29, 2016.*

(Continued)

*Primary Examiner* — Antonio A Caschera

(57) ABSTRACT

A color to be emulated by an ambient light source associated to a display is determined. A saliency map is determined for an image displayed on the display. A subset of pixels of the image with a saliency below a given threshold is selected based on the saliency map. The color to be emulated by the ambient light source is then determined from color values of the determined subset of pixels.

18 Claims, 3 Drawing Sheets

(56) References Cited

U.S. PATENT DOCUMENTS

| | | | |
|---|---|---|---|
| 8,063,992 | B2 | 11/2011 | Gutta et al. |
| 8,179,400 | B2 | 5/2012 | Kwisthout |
| 2007/0242162 | A1 | 10/2007 | Gutta et al. |
| 2009/0059589 | A1 | 3/2009 | Huang et al. |
| 2009/0175555 | A1 | 7/2009 | Mahowald |
| 2010/0201878 | A1 | 8/2010 | Barenbrug et al. |

OTHER PUBLICATIONS

Robert Wanat and Real. K. Mantiuk. 2014. Simulating and compensating changes in appearance between day and night vision. ACM Trans. Graph. 33, 4, Article 147 (Jul. 2014).*

Meur et al: "A coherent computational approach to model bottom-up visual attention", Transactions on Pattern Analysis AndMachine Intelligence, IEEE, vol. 28, No. 5, May 1, 2006 (May 1, 2006), pp. 802-817.

Search Report Dated Dec. 16, 2013.

Fabien Danieau, Julien Fleureau, Audrey Cabec, Paul Kerbiriou, Philippe Guillotel: "A Framework for Enhancing Video Viewing Experience with Haptic Effects of Motion" IEEE Haptics Symposium; Vancouver, Canada; Mar. 4-7, 2012.

Derek Gaw, Daniel Morris, Kenneth Salisbury: "Haptically Annotated Movies: Reaching Out and Touching the Silver Screen", Symposium on Haptic Interfaces for Virtual Environment and Teleoperator Systems; Alexandria, Virginia, USA; Mar. 25-26, 2006.

Monson, H. Hayes: "Statistical Digital Signal Processing and Modeling" published by John Wiley & Sons, Inc., 1996.

Ali Israr and Ivan Poupyrev: "Tactile Brush: Drawing on Skin with a Tactile Grid Display", CHI 2011; Vancouver, Canada; May 7-12, 2011.

Yeongmi Kim, Jongeun Cha, Jeha Ryu: "A Tactile Glove Design and Authoring System for Immersive Multimedia", IEEE Computer Society, mmu2010030006.3d, pp. 2-12, Jun. 29, 2010.

Md. Abdur Rahman, Abdulmajeed Alkhaldi, Jongeun Cha, Abdulmotaleb El Saddik: "Adding Haptic Feature to YouTube", MM'10; Firenze, Italy; Oct. 25-29, 2010.

Jonghyun Ryu and Seungmoon Choi: "posVibEditor: Graphical Authoring Tool of Vibrotactile Patterns", HAVE 2008—IEEE International Workshop on Haptic Audio Visual Environments and Games; Ottawa, Canada; Oct. 18-19, 2008.

Yuta Takeuchi, Sho Kamuro, Kouta Minamizawa, Susumu Tachi: "Haptic Duplicator", Laval Virtual VRIC '12; Laval, France; Mar. 28-Apr. 1, 2012.

M. Zaheer Aziz and Barbel Mertsching: "Pre-Attentive Detection of Depth Saliency Using Stereo Vision", Applied Imagery Pattern Recognition Workshop (AIPR), 2010 IEEE 39th, Oct. 13-15, 2010.

Yun Zhang, Gangyi Jiang, Mei Yu, Ken Chen: "Stereoscopic Visual Attention Model for 3D Video", MMM 2010, LNCS 5916, pp. 314-324, 2010.

Yun Zhang, Gangyi Jiang, Mei Yu, Ken Chen, Qionghai Dai: "Stereoscopic Visual Attention-Based Regional Bit Allocation Optimization for Multiview Video Coding", EURASIP Journal on Advances in Signal Processing vol. 2010, Article ID 848713, 24 pages, 2010.

* cited by examiner

METHOD AND APPARATUS FOR AMBIENT LIGHTING COLOR DETERMINATION

This application claims the benefit, under 35 U.S.C. §365 of International Application PCT/EP2013/070094, filed Sep. 26, 2013, which was published in accordance with PCT Article 21(2) on Apr. 10, 2014 in English and which claims the benefit of European patent application No. 12306210.1, filed Oct. 4, 2012.

FIELD OF THE INVENTION

The present invention relates to a method and an apparatus for determining a color to be emulated by an ambient light source associated to a display, and more specifically to a method and an apparatus for determining a color to be emulated by an ambient light source with an improved ambient color computation.

BACKGROUND OF THE INVENTION

New technology developments allow the creation of more and more immersive multimedia systems. 3D images and sound spatialization are now present in the end-user living space. In line with those new enhancements, alternative technologies propose to extend the audiovisual experience by providing ambient lighting. For ambient lighting several light spots composed of three colored LEDs are located around the screen. These light spots provide light effects in accordance with the content of the video that is displayed on the screen.

To be efficient and immersive, such systems have to provide a lighting color that is appropriate for the visual content. The different technologies available on the market generally adopt a similar strategy that will be detailed hereafter.

The screen is divided into several areas depending on the position and the number of lighting units. The areas may be spread all over the screen or only along the borders, close to their associated lighting unit. One area is generally associated to one lighting unit. The color to render by each unit is determined by the color properties of the corresponding area. Two different methods are generally considered. The first one consists in choosing the average color in each of the separated areas, whereas the other one uses the main hue and saturation in each of these areas of the screen.

A more advanced method for determining colors to be emulated by an ambient light source is disclosed, for example, in US 2007/0242162. The colors are extracted from video content using perceptual rules for intelligent dominant color selection. The scene content is taken into account when determining the colors. For this purpose content analysis is used.

Even though the available systems provide interesting effects, the underlying technologies are often not accurate enough to nicely extend the screen, especially when the number of light devices is reduced. Indeed, the mean color or the main hue and saturation components do not necessarily match the actual "ambient" color and it can lead to unexpected renderings.

SUMMARY OF THE INVENTION

It is an object of the present invention to propose a solution for determining a color for ambient lighting with an improved ambient color computation.

According to the invention, a method for determining a color to be emulated by an ambient light source associated to a display comprises the steps of:
  determining a saliency map for an image displayed on the display;
  determining a subset of pixels of the image with a saliency below a given threshold; and
  determining the color to be emulated by the ambient light source from color values of the determined subset of pixels.

Accordingly, an apparatus for determining a color for ambient lighting comprises:
  means for determining a saliency map for an image displayed on the display;
  a saliency analyzer for determining a subset of pixels of the image with a saliency below a given threshold; and
  a color computation unit for determining the color to be emulated by the ambient light source from color values of the determined subset of pixels.

A new method to compute the color to be emulated by the ambient light source in accordance with the current visual content is proposed. To improve the ambient color computation, a saliency map is used to identify and discriminate the non-salient and salient parts of the current image. The underlying assumption is that the non-salient content is preferably used to efficiently compute the final ambient lighting color. This has the advantage that the ambient color is determined in a more meaningful way. The resulting colors lead to an enhanced user experience. In addition, once a saliency map is available, the salient parts of the image may be used to define "foreground" lights, i.e. salient lights.

The saliency map is preferably determined by analyzing the image, e.g. with a processor. Alternatively, an existing saliency map associated to the image is retrieved by a retrieving unit. This saliency map may be embedded as metadata in the image or be part of a data stream containing the image. Of course, it may likewise be retrieved from an independent source via an input.

Advantageously, the threshold is chosen such that the determined subset of pixels contains a specified percentage of the pixels of the image, preferably a decile of the pixels. This ensures that the subset always contains a sufficient number of pixels to determine a meaningful color value. Subjective tests strongly suggest that the selection of a decile of the pixels is appropriate to determine good color values without too much computational effort.

Preferably, the color is determined as one of a saliency-weighted sum of the color values of the subset of pixels, a median of the color values of the subset of pixels, and a most represented color value of the subset of pixels.

If more than one ambient light source is used, or if only certain areas of the image shall form the basis for color determination, the subset of pixels of the image with a saliency below the given threshold is determined only for a portion of the image associated to the ambient light source. This avoids unnecessary computations and allows obtaining different color values for different ambient light sources.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

In order to describe the general idea of the present invention and an exemplary implementation of the proposed system, in the following the simple case of a lighting system composed of a single lighting unit shall be considered. The different possible screen splits mentioned further above are not detailed, as the extension to those cases is straightforward for a skilled person.

Figure 1:
FIG. 1 shows an image for which an ambient lighting color is to be computed.
Figure 2:
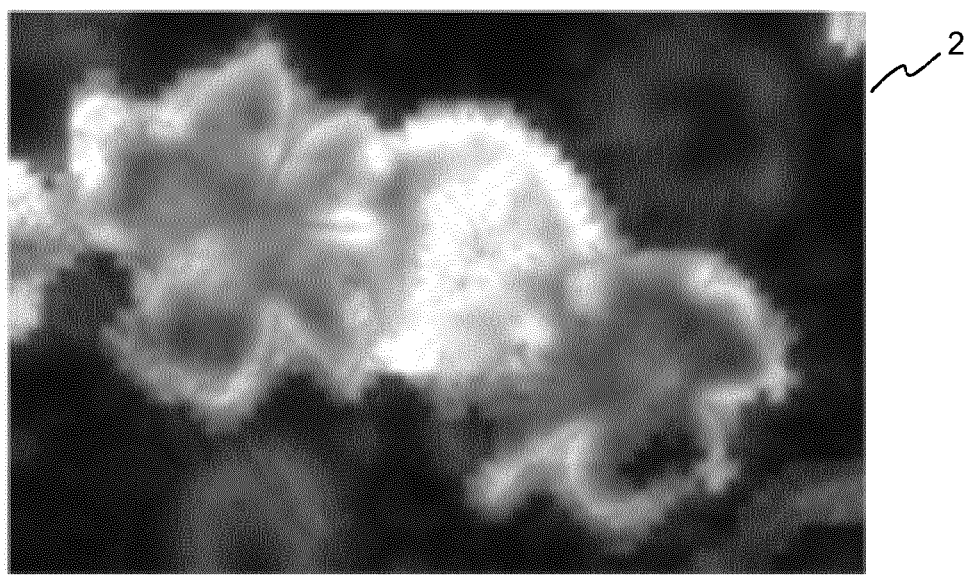
FIG. 2 depicts a saliency map for the image of FIG. 1.

A key point of the system consists in computing what the user would consider as the foreground and the background in a given image or video. To define these two different parts in the current image, the corresponding saliency map is computed. Saliency maps are discussed, inter alia, in O. Le Meur et al.: "*A coherent computational approach to model the bottom-up visual attention*", IEEE Trans. Pattern. Anal. Mach. Intell. Vol. 28, pp. 802-817. Such a map provides the saliency of each pixel of the image, according to various parameters such as colors, brightness, contrasts, etc. An exemplary image 1 is shown in FIG. 1. The corresponding saliency map 2 is depicted in FIG. 2. The foreground of the image is then arbitrarily associated to the most salient parts, whereas the background is associated to the less salient parts.

A threshold in the saliency map is determined to discriminate between these two latter zones. This threshold is preferably computed as the value below which the first decile of the less salient pixels is gathered.

Other thresholds depending on other statistical options may of course be considered. However, subjective tests strongly suggest that such a choice is beneficial in this context. The color to associate to the lighting unit is then computed as the saliency-weighted color of the group of pixels associated to the background.

This can be formalized by the following relation:

$$AmbientColor = \frac{\sum_i \left(\left(1 - \frac{saliency_i}{255}\right) \cdot color_i\right)}{\sum_i \left(1 - \frac{saliency_i}{255}\right)}, \quad (1)$$

Where i is the index of a pixel in the first decile of the saliency map, saliency is the list of saliency values of the first decile of the saliency map (between 0 and 255), and color is the list of RGB colors of the first decile of the saliency map.

Figure 3:
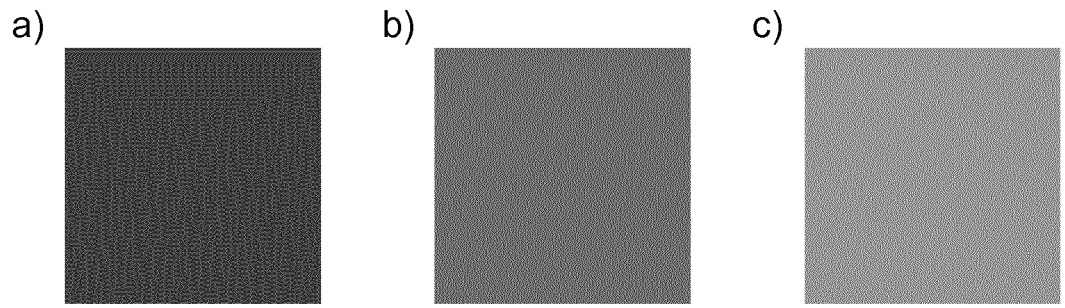
FIG. 3 shows ambient color computation results for different computation approaches.

The performance of the proposed approach on the image introduced in FIG. 1 is illustrated in FIG. 3. As the computed colors can only be represented by their grey values in the figure, the actual RGB values are also indicated. FIG. 3a) shows the color determined by the proposed method. The actual RGB value is (44,90,4). FIG. 3b) is the result of a simple averaging over the entire image. The RGB value (116,106,108). FIG. 3c) shows the computed color when the color with the main hue value is considered. The RGB value is (220,102,228).

Other alternatives to compute the ambient color make use of the median or the most represented color (computed on the red, green and blue channels) among the pixels with a saliency lower than the given threshold.

In the case of multiple lighting units, spatially coherent clusters are preferably identified in the saliency map. The mean, median, or max color computed on each of these clusters is then associated to the lighting units in dependence on their spatial configuration.

Figure 4:
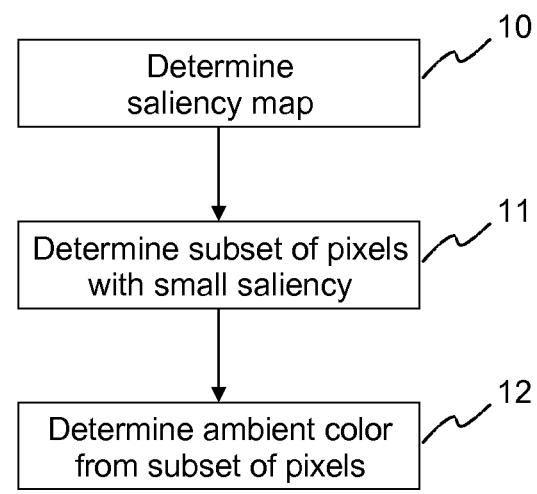
FIG. 4 schematically illustrates a method according to the invention for determining a color to be emulated by an ambient light source.

FIG. 4 schematically illustrates a method according to the invention for determining a color to be emulated by an ambient light source associated to a display. In a first step a saliency map 2 is determined 10 for an image 1 displayed or to be displayed on the display, e.g. by analyzing the image 1 or by retrieving an existing saliency map 2 associated to the image 1. Then a subset of pixels of the image 1 with a saliency below a given threshold is determined 11. Finally, the color to be emulated by the ambient light source is determined 12 from color values of the determined subset of pixels. For this purpose one of the above described computation approaches is used.

Figure 5:
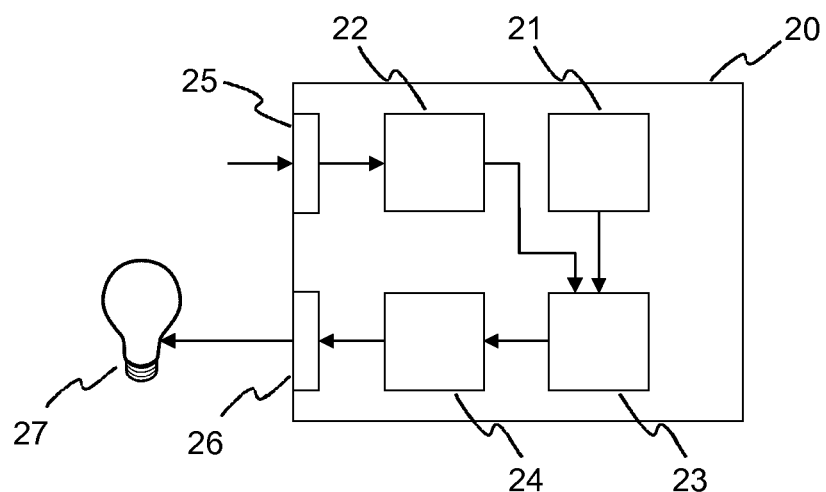
FIG. 5 schematically shows an apparatus according to the invention for determining a color to be emulated by an ambient light source.

An apparatus 20 according to the invention for determining a color to be emulated by an ambient light source 27 associated to a display is schematically shown in FIG. 5. The apparatus 20 comprises means 21, 22 for determining 10 a saliency map 2 for an image 1 displayed or to be displayed on the display, such as a processor 21 for analyzing the image 1 or a saliency map retrieving unit 22 for retrieving an existing saliency map 2 associated to the image 1. For example, the saliency map retrieving unit 22 may retrieve a saliency map embedded as metadata in the image or provided as part of a data stream containing the image. It may likewise retrieve the saliency map from an independent source via an input 25. The apparatus 20 further comprises a saliency analyzer 23 for determining 11 a subset of pixels of the image 1 with a saliency below a given threshold and a color computation unit 24 for determining 12 the color to be emulated by the ambient light source from color values of the determined subset of pixels. An output 26 is provided for providing the determined color to the ambient light source 27.

The invention claimed is:

1. A method for providing to an ambient light source associated with a display a color to be emulated, the method comprising:
   determining a saliency map for an image displayed on the display;
   determining a subset of pixels of the image with a saliency below a given threshold; and
   determining the color to be emulated by the ambient light source from color values of the determined subset of pixels, wherein the color is determined as a saliency-weighted color of the determined subset of pixels; and
   outputting the determined color to the ambient light source for the emulating.

2. The method according to claim 1, wherein the saliency map is determined by analyzing the image or by retrieving an existing saliency map associated to the image.

3. The method according to claim 1, wherein the threshold is chosen such that the determined subset of pixels contains a specified percentage of the pixels of the image.

4. The method according to claim 3, wherein the threshold is chosen such that the determined subset of pixels contains a decile of the pixels of the image.

5. The method according to claim 1, wherein the subset of pixels of the image with a saliency below the given threshold is determined for a portion of the image associated with the ambient light source.

6. An apparatus for providing to an ambient light source associated with a display a color to be emulated, the apparatus comprising:
   a processor configured to:
   determine a saliency map for an image displayed on the display;
   determine a subset of pixels of the image with a saliency below a given threshold;
   determine the color to be emulated by the ambient light source from color values of the determined subset of pixels, wherein the color is determined as a saliency-weighted color of the determined subset of pixels; and
   an output configured to provide the determined color to the ambient light source for the emulating.

7. The apparatus according to claim 6, wherein the processor is configured to determine the saliency map by analyzing the image or retrieving an existing saliency map associated with the image.

8. The apparatus according to claim 6, wherein the threshold is chosen such that the determined subset of pixels contains a specified percentage of the pixels of the image.

9. The apparatus according to claim 8, wherein the threshold is chosen such that the determined subset of pixels contains a decile of the pixels of the image.

10. The apparatus according to claim 6, wherein the processor is configured to determine the subset of pixels of the image with a saliency below the given threshold for a portion of the image associated with the ambient light source.

11. A method for providing a color to be emulated to an ambient light source associated with a display, the method comprising:
    determining the color to be emulated by the ambient light source from color values of a subset of pixels of an image displayed on the display, the subset of pixels having a saliency below a determined value, wherein the color is determined as a saliency-weighted color of said subset of pixels; and
    outputting the determined color to the ambient light source for the emulating.

12. The method according to claim 11, wherein said saliency is obtained from a saliency map determined by analyzing the image or by retrieving an existing saliency map associated with the image.

13. The method according to claim 11, wherein said subset of pixels is chosen such that said subset of pixels contains a specified percentage of the pixels of the image.

14. The method according to claim 11, wherein said determined value is calculated as the value below which a first decile of the less salient pixels of the image is gathered.

15. An apparatus configured to provide a color to be emulated to an ambient light source associated with a display, the apparatus comprising:
    a processor configured to determine the color to be emulated by the ambient light source from color values of a subset of pixels of an image displayed on the display, the subset of pixels having a saliency below a determined value, wherein the color is determined as a saliency-weighted color of said subset of pixels; and
    an output configured to provide the determined color to the ambient light source for the emulating.

16. The apparatus according to claim 15, wherein said processor is further configured to obtain said saliency from a saliency map determined by analyzing the image or by retrieving an existing saliency map associated with the image.

17. The apparatus according to claim 15, wherein said subset of pixels is chosen such that said subset of pixels contains a specified percentage of the pixels of the image.

18. The apparatus according to claim 15, wherein said processor is further configured to calculate said determined value as the value below which a first decile of the less salient pixels of the image is gathered.

* * * * *